(12) United States Patent
Suciu et al.

(10) Patent No.: US 8,602,717 B2
(45) Date of Patent: Dec. 10, 2013

(54) COMPRESSION SYSTEM FOR TURBOMACHINE HEAT EXCHANGER

(75) Inventors: Gabriel L. Suciu, Glastonbury, CT (US); Jorn A. Glahn, Manchester, CT (US); Christopher M. Dye, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 661 days.

(21) Appl. No.: 12/914,976

(22) Filed: Oct. 28, 2010

(65) Prior Publication Data

US 2012/0107104 A1     May 3, 2012

(51) Int. Cl.
*F01D 5/18* (2006.01)
*F01D 5/08* (2006.01)

(52) U.S. Cl.
USPC ............ 415/1; 415/115; 415/116; 415/122.1; 415/178; 415/179

(58) Field of Classification Search
USPC ................... 415/1, 115, 116, 122.1, 178, 179
See application file for complete search history.

(56) References Cited

U.S. PATENT DOCUMENTS

| | | | |
|---|---|---|---|
| 3,577,965 A * | 5/1971 | Sundberg | 417/405 |
| 3,638,428 A | 2/1972 | Shipley et al. | |
| 4,187,675 A | 2/1980 | Wakeman | |
| 4,254,618 A | 3/1981 | Elovic | |
| 4,474,001 A | 10/1984 | Griffin et al. | |
| 4,546,605 A | 10/1985 | Mortimer et al. | |
| 4,715,779 A | 12/1987 | Suciu | |
| 4,773,212 A | 9/1988 | Griffin et al. | |
| 4,782,658 A | 11/1988 | Perry | |
| 4,791,782 A | 12/1988 | Seed | |
| 4,914,904 A | 4/1990 | Parnes et al. | |
| 4,999,994 A | 3/1991 | Rud et al. | |
| 5,039,281 A * | 8/1991 | Johnston | 417/212 |
| 5,044,153 A | 9/1991 | Mouton | |
| 5,058,375 A | 10/1991 | Shekelton et al. | |
| 5,105,875 A | 4/1992 | McArthur | |
| 5,265,408 A | 11/1993 | Sheoran et al. | |
| 5,269,135 A | 12/1993 | Vermejan et al. | |
| 5,284,012 A * | 2/1994 | Laborie et al. | 60/39.08 |
| 5,359,247 A | 10/1994 | Baldwin et al. | |
| 5,363,641 A | 11/1994 | Dixon et al. | |
| 5,438,823 A * | 8/1995 | Loxley et al. | 60/39.08 |
| 5,655,359 A | 8/1997 | Campbell et al. | |
| 6,092,360 A | 7/2000 | Hoag et al. | |
| 6,237,322 B1 | 5/2001 | Rago | |
| 6,651,929 B2 | 11/2003 | Dionne | |
| 6,942,181 B2 | 9/2005 | Dionne | |
| 7,040,576 B2 | 5/2006 | Noiseux | |
| 7,055,330 B2 | 6/2006 | Miller | |
| 7,152,410 B2 | 12/2006 | Sheoran et al. | |
| 7,337,605 B2 * | 3/2008 | Hagshenas | 60/39.08 |

(Continued)

FOREIGN PATENT DOCUMENTS

| | | |
|---|---|---|
| GB | 2085085 | 4/1982 |
| GB | 2142147 | 1/1985 |

*Primary Examiner* — Igor Kershteyn
(74) *Attorney, Agent, or Firm* — Carlson, Gaskey & Olds P.C.

(57) ABSTRACT

An example turbomachine cooling arrangement includes a pump configured to pressurize a first turbomachine fluid that is then communicated through a heat exchanger assembly to remove thermal energy from a second turbomachine fluid. A portion of the pump is configured to be housed within a gearbox housing of a turbomachine.

20 Claims, 5 Drawing Sheets

(56) References Cited

U.S. PATENT DOCUMENTS

| | | | |
|---|---|---|---|
| 7,631,485 B2 * | 12/2009 | Suciu et al. | 60/226.1 |
| 8,516,828 B2 * | 8/2013 | Glahn | 60/785 |
| 2008/0028763 A1 | 2/2008 | Schwarz et al. | |
| 2008/0314573 A1 | 12/2008 | Schwarz et al. | |
| 2010/0107603 A1 | 5/2010 | Smith | |
| 2010/0170262 A1 | 7/2010 | Kaslusky et al. | |

* cited by examiner

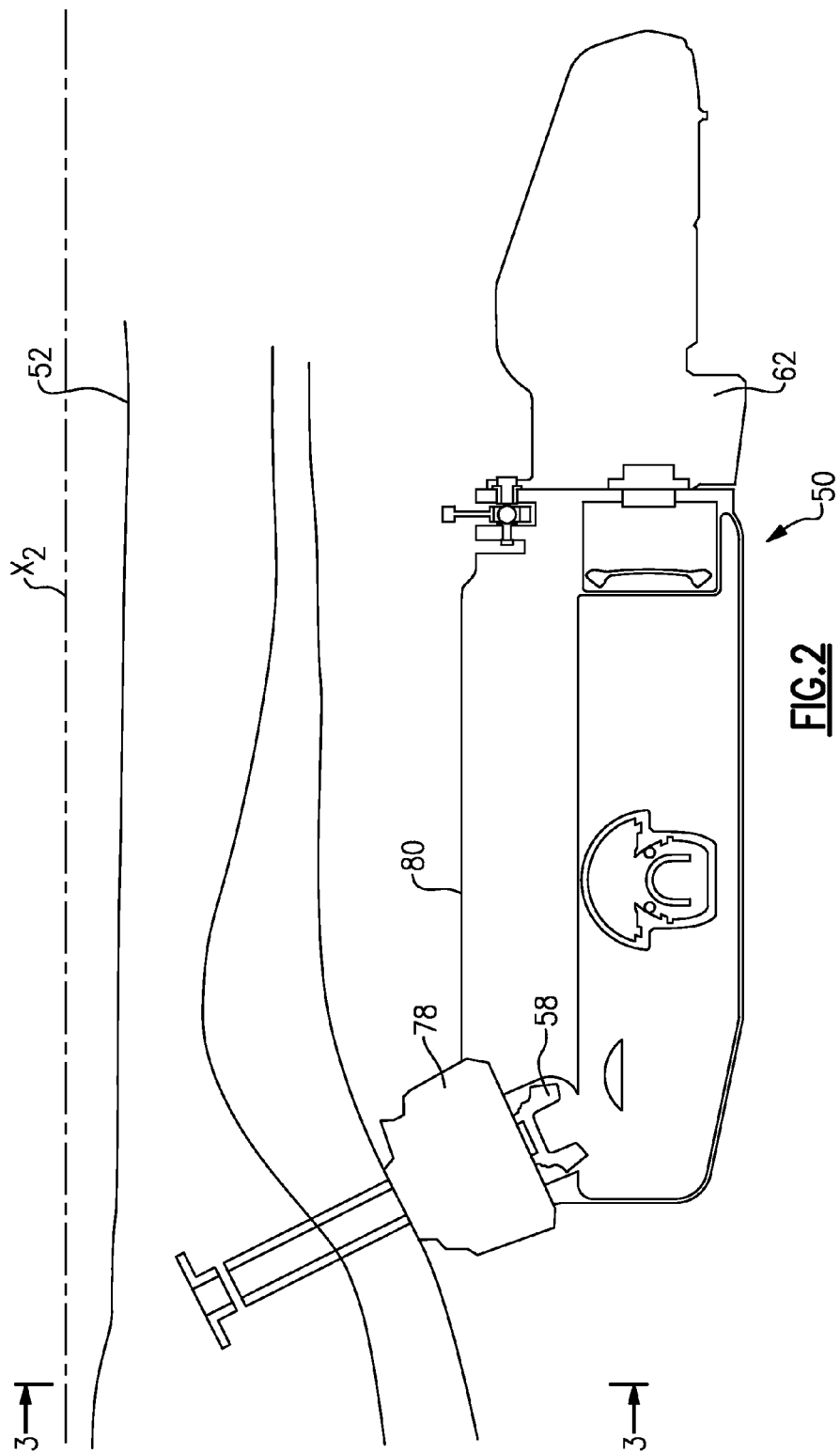

US 8,602,717 B2

COMPRESSION SYSTEM FOR TURBOMACHINE HEAT EXCHANGER

BACKGROUND

This disclosure relates generally to a heat exchanger and, more particularly, to compressing a fluid using a pump within a gearbox of the turbomachine.

As known, turbomachines extract energy from a flow of fluid, for example, airflow. Typical turbomachines include multiple sections, such as a fan section, a compression section, a combustor section, and a turbine section. During operation, the fan section pulls air into the turbomachine. The air is then compressed and combusted. The products of combustion expand to rotatably drive the turbine section.

In some turbomachines, a towershaft extends from a main shaft. The towershaft rotatably drives a gearbox, which drives a lubricant pump, for example. The lubricant pump circulates lubricant, such as oil, throughout the turbomachine. During operation, the turbomachine generates significant levels of thermal energy that could damage components of the turbomachine. The lubricant is heated by the thermal energy as the lubricant moves through the turbomachine.

Many turbomachines, such as gas turbine engines, use heat exchangers to help move thermal energy away from the engine. In one example, heated lubricant is circulated though a heat exchanger. Air is then moved through the heat exchanger to carry thermal energy away from the lubricant. Relatively large heat exchangers are difficult to install within the turbomachine and are costly to produce.

SUMMARY

An example turbomachine cooling arrangement includes a pump configured to pressurize a first turbomachine fluid that is then communicated through a heat exchanger assembly to remove thermal energy from a second turbomachine fluid. A portion of the pump is configured to be housed within a gearbox housing of a turbomachine.

An example turbomachine assembly includes a turbomachine and a gearbox associated with the turbomachine. A pump is at least partially mounted within the gearbox. The pump is configured to compress a fluid provided by the turbomachine. The assembly further includes a heat exchanger assembly that is configured to receive the first fluid from the pump. The thermal energy moves from a second fluid to the first fluid within the heat exchanger assembly.

An example method of cooling a turbomachine fluid includes compressing a first fluid using a pump housed within a turbomachine gearbox and communicating thermal energy from a second fluid using the first fluid.

These and other features of the disclosed examples can be best understood from the following specification and drawings, the following of which is a brief description.

BRIEF DESCRIPTION OF THE FIGURES

FIG. 2 shows a close-up view of a gearbox of another gas turbine engine.

DETAILED DESCRIPTION

Figure 1:
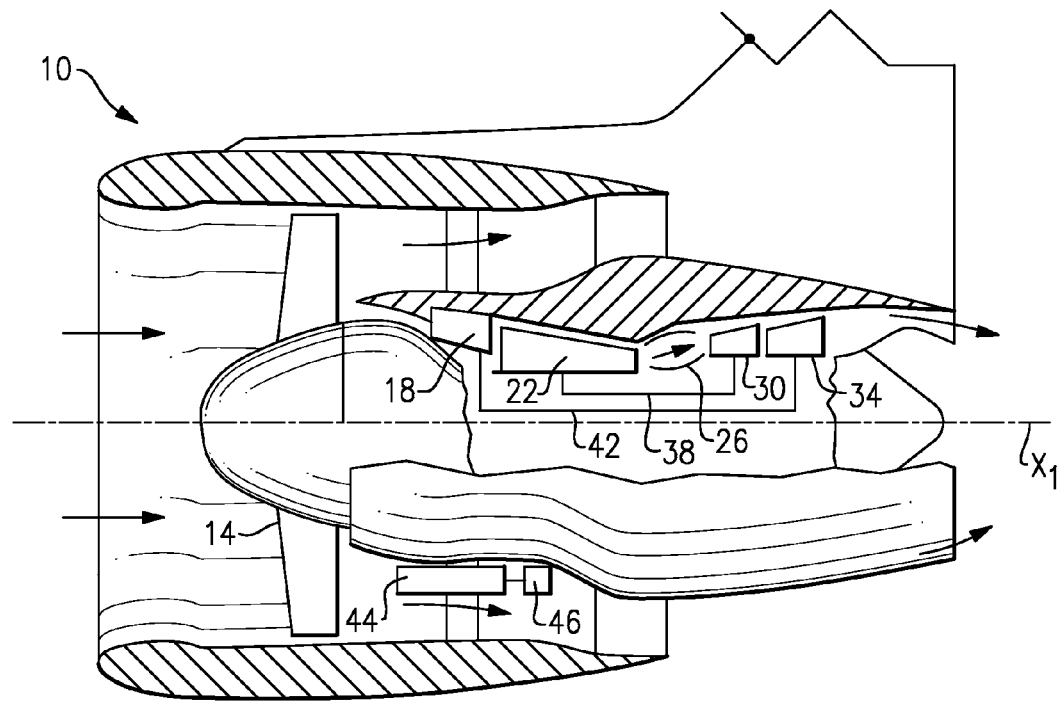
FIG. 1 schematically shows an example gas turbine engine.

FIG. 1 schematically illustrates an example gas turbine engine 10 including (in serial flow communication) a fan 14, a low pressure compressor 18, a high pressure compressor 22, a combustor 26, a high pressure turbine 30, and a low pressure turbine 34. The gas turbine engine 10 is circumferentially disposed about an engine axis $X_1$. The gas turbine engine is an example turbomachine.

During operation, air is pulled into the gas turbine engine 10 by the fan 14, pressurized by the compressors 18 and 22, mixed with fuel (not shown), and burned in the combustor 26. The turbines 30 and 34 extract energy from the hot combustion gases flowing from the combustor 26. In a two-spool design, the high pressure turbine 30 utilizes the extracted energy from the hot combustion gases to power the high pressure compressor 22 through a high speed shaft 38. The low pressure turbine 34 utilizes the extracted energy from the hot combustion gases to power the low pressure compressor 18 and the fan 14 through a low speed shaft 42.

An engine accessory gearbox 44 of the engine 10 drives a lubricant pump 46. A tower shaft (not shown) extends radially from the low speed shaft 42 to rotatably drive the gearbox 44. The lubricant pump 46 is used to circulate lubricant though the engine 10. Also typically driven by the engine accessory gearbox 44 are additional components including aircraft hydraulic pumps, electrical generators, engine fuel pumps, PMAs (Permanent Magnet Alternators), and gearbox de-oiling devices. Also typical are the use of air-driven turbine starters, which are attached to the gearbox and use air power from an aircraft APU (Auxiliary Power Unit) to turn the engine via the gearbox drive system for the purpose of starting.

The examples described in this disclosure are not limited to the two-spool engine architecture described and can be used in other architectures, such as a single spool axial design, a three-spool axial design, and still other architectures. That is, there are various types of engines, and other turbomachines, that can benefit from the examples disclosed herein.

Referring to FIGS. 2-5, a gearbox 50 is disposed within another example gas turbine engine 52. The gearbox 50 is rotatably driven by a main shaft of the engine 52 through a towershaft 54. The towershaft 54 includes a bevel gear portion 58 that rotates to drive the gearbox 50. The towershaft 54 rotates at 21,500 RPM in one example. A person having skill in this art and the benefit of this disclosure would understand how to rotatably drive the gearbox 50 utilizing the towershaft 54.

In this example, a lubricant pump 62 is mounted near the gearbox 50. The gearbox 50 drives the lubricant pump 62, which then pumps lubricant through various areas of the engine 52 to lubricate moving components. Lubricant is an example type of turbomachine fluid.

As can be appreciated, the lubricant is heated when moving through some areas of the engine 52. For example, components within the engine 52 generate thermal energy as they are moved relative to each other. The lubricant circulates past those components and absorbs some of that thermal energy.

In this example, a heat exchanger assembly 66 is used to remove heat from the lubricant circulated through the engine 52. The example heat exchanger assembly 66 includes a first heat exchanger 70 and a second heat exchanger 74. In other example, the heat exchanger assembly includes a single heat exchanger, or more than two heat exchangers.

During operation, heated lubricant is communicated through the example heat exchanger assembly 66. Air moving through the heat exchanger assembly 66 absorbs thermal energy from the lubricant. The heated air is then moved away from the engine 52.

The lubricant, which has been cooled, moves back to the lubricant pump 62 after moving through the heat exchanger assembly 66. The lubricant is then circulated back through the engine 52.

The example heat exchanger assembly 66 is an oil-air heat exchanger. Other examples may use heat exchangers configured to exchange thermal energy between other fluids.

An air pump 78 compresses the air that is moved across the heat exchanger assembly 66, in this example. At least a portion of the example air pump 78 is housed within the gearbox 50. The example air pump 78 is also positioned radially between a gearbox housing 80 and an axis $X_2$ of the engine 52.

The example air pump 78 is a rotary driven air pump 78 that is rotated using the towershaft 54. The air pump 78 is configured to increase the pressure of flow of air though the heat exchanger assembly 66. The air pump 78 has a scroll diffuser 82 that, when rotated, compresses air in a known manner.

In this example, an inlet manifold 86 communicates air from a fan stream of the engine 10 to the air pump 78. The air pump 78 compresses this air, which is then moved through an outlet manifold 90 back to the fan stream and away from the engine 52.

The heat exchanger assembly 66 is disposed within the outlet manifold 90 in this example. The heat exchanger assembly 66 is disposed within the inlet manifold 86 in another example. The compressed air moves through the heat exchanger assembly 66 as the compressed air moves through the outlet manifold 90. Compressing the air enables a greater volume of air to move through the heat exchanger assembly 66, which facilitates moving thermal energy away from the lubricant.

Figure 6:
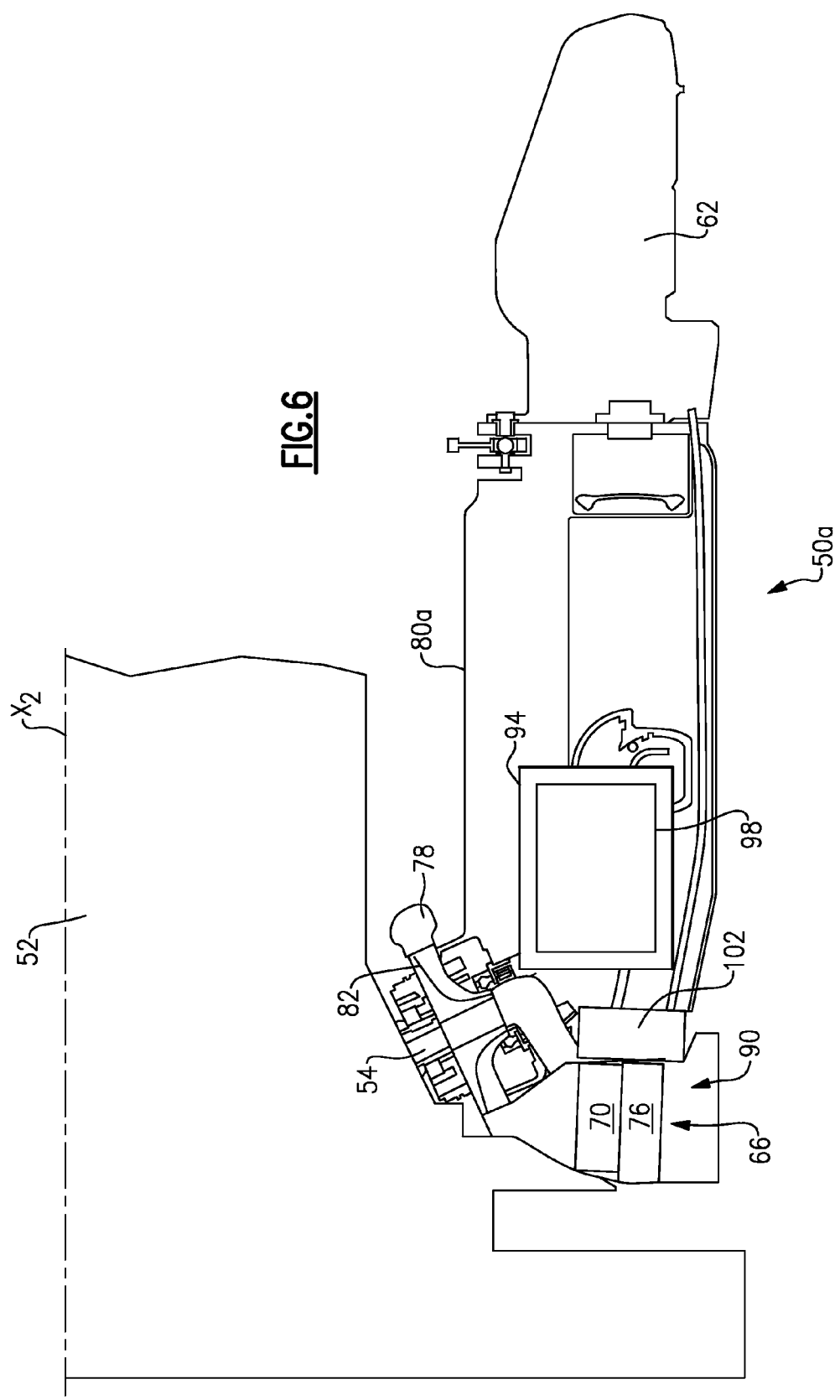
FIG. 6 shows another example embodiment gearbox.

Referring to FIG. 6, in another example, a gearbox 50a includes a fuel pump pad 94. A fuel pump 98 is mounted directly to the fuel pump pad 94. A housing 80a of the gearbox 50a establishes the fuel pump pad 94. A fuel-to-oil heat exchanger 102 is also mounted directly to the example housing 80a of the example gearbox 50a.

In this example, lubricant, which is carrying thermal energy, is communicated through the fuel-oil heat exchanger 102 before moving though the heat exchanger assembly 66. Within the fuel-oil heat exchanger 102, some thermal energy moves from the heated lubricant to a fuel that is then communicated to the fuel pump 94 for injection into the combustion section of the engine 52. Some of the remaining thermal energy in the heated lubricant then moves to the compressed air moving though the heat exchanger assembly 66. The lubricant then moves back to the lubricant pump 62. Oil is the lubricant in this example. Other examples include other types of lubricant.

Moving the heated lubricant through the fuel oil heat exchanger 102 facilitates preheated fuel prior to injection and removing thermal energy from a heated lubricant.

Figure 7:
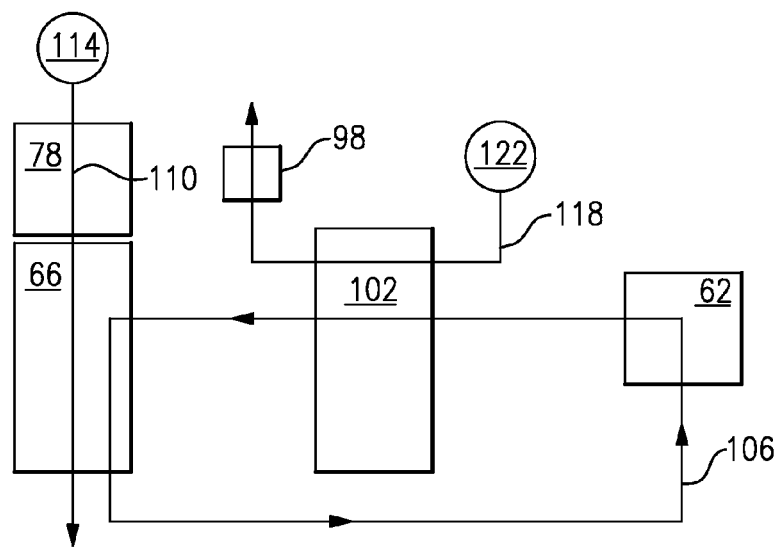
FIG. 7 shows a highly schematic view of the turbomachine fluid flow in the FIG. 1 example.
Figure 3:
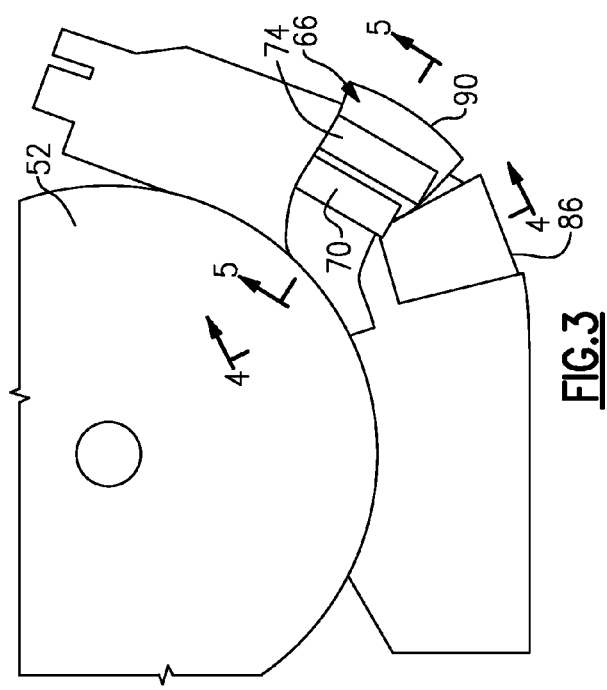
FIG. 3 shows a section view taken at line 3-3 of FIG. 2.
Figure 4:
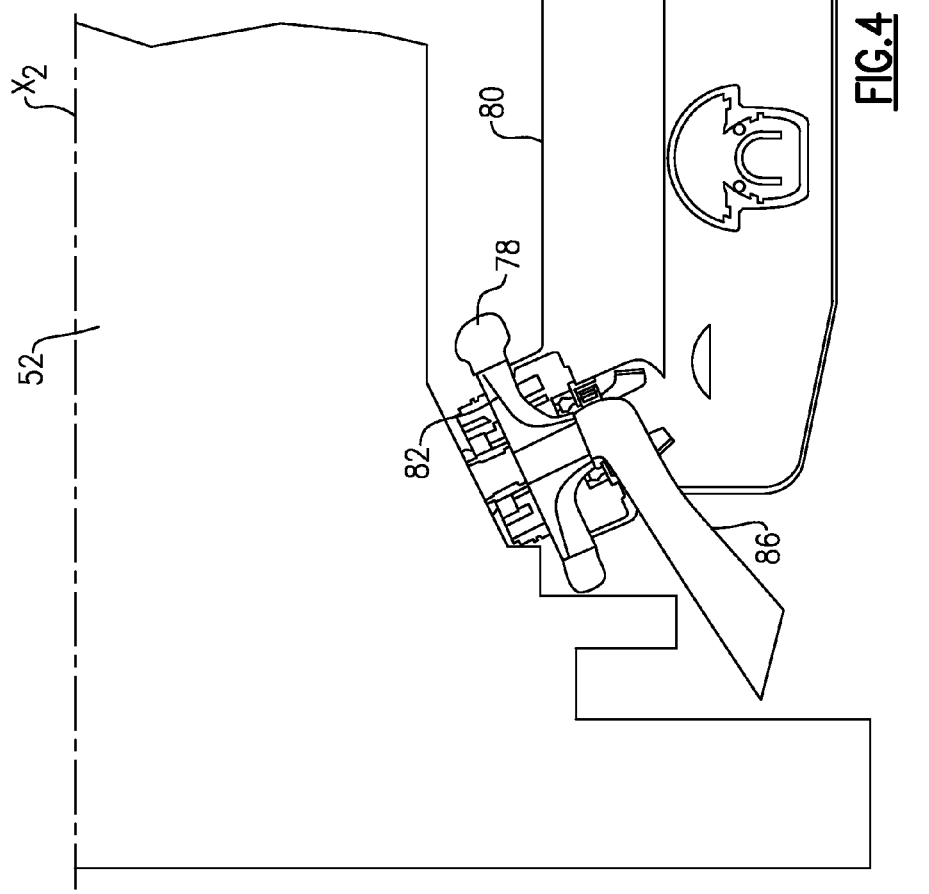
FIG. 4 shows a partial schematic section view taken at line 4-4 of FIG. 3.
Figure 5:
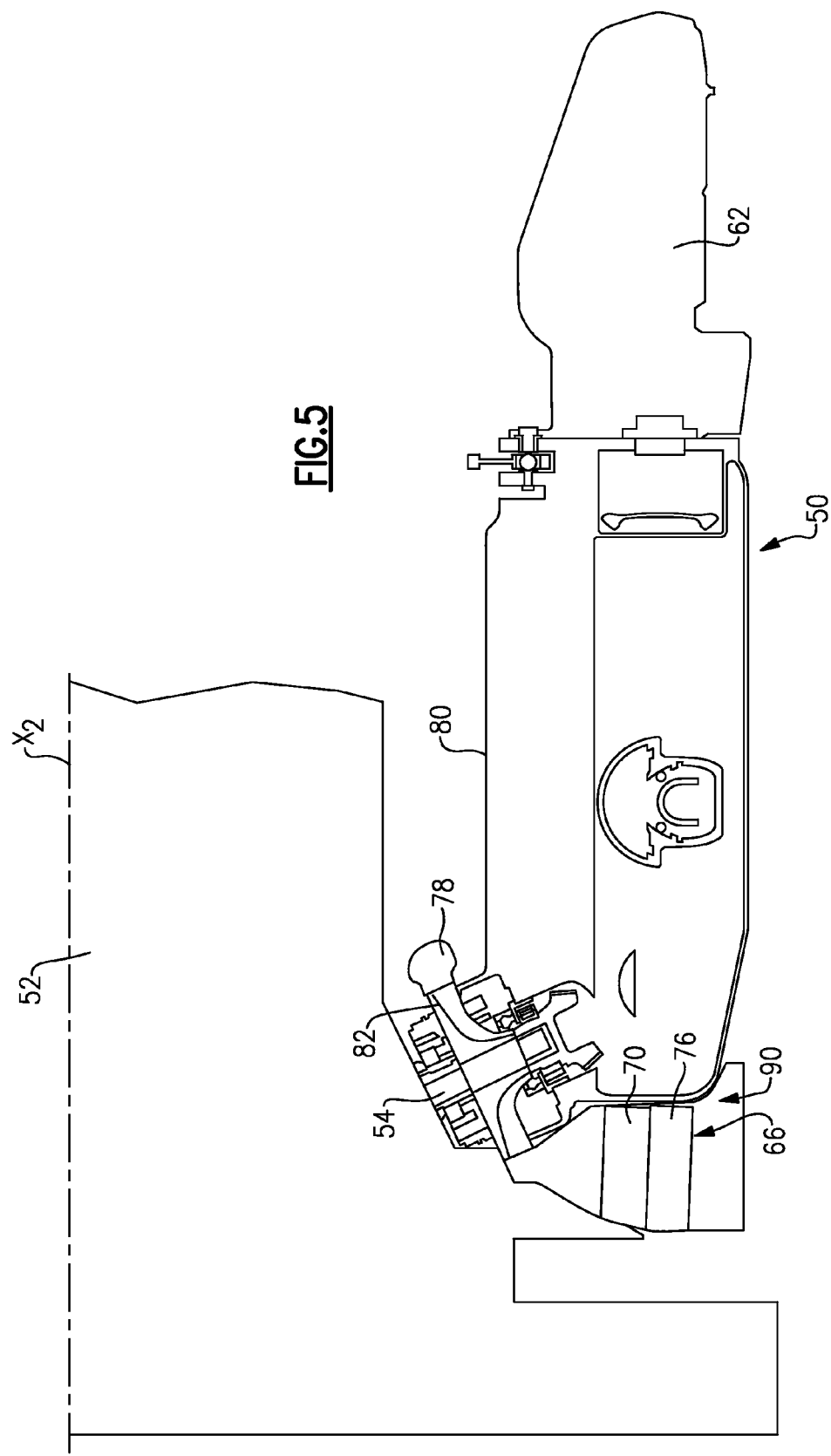
FIG. 5 shows a partial schematic section view taken at line 5-5 of FIG. 3.

Referring to FIG. 7, a lubricant path 106 represents the circulation of lubricant between the lubricant pump 62, the fuel-oil heat exchanger 102, and the heat exchanger assembly 66. An air path 110 represents the movement of air from an air supply 114, through the air pump 78, and through the heat exchanger assembly 66. A fuel path 118 represents the movement of fuel from a fuel supply 122, through the fuel-oil heat exchanger 102, to the fuel pump 98.

Features of the disclosed examples include communicating a compressed fluid through a heat exchanger assembly to remove thermal energy from a turbomachine fluid. Compressing the air enables a smaller heat exchanger to be used. Air compression is achieved utilizing some components that are already providing a rotational input to the gearbox, which further reduces required packaging space.

Another feature of the disclosed examples are the ability to mount a fuel pump and a fuel-oil heat exchanger directly to the gearbox near the air-oil heat exchangers. In the prior art, air-oil heat exchangers were located apart from the gearbox making it difficult to communicate lubricant between the two heat exchangers.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A turbomachine cooling arrangement comprising:
a pump configured to pressurize a first turbomachine fluid that is then communicated through a heat exchanger assembly to remove thermal energy from a second turbomachine fluid, wherein at least a portion of the pump is configured to be housed within a gearbox housing of a turbomachine.

2. The turbomachine cooling arrangement of claim 1, wherein the pump is configured to be driven by the turbomachine.

3. The turbomachine cooling arrangement of claim 2, wherein a towershaft of the turbomachine rotatably drives the pump.

4. The turbomachine cooling arrangement of claim 1, wherein the first turbomachine fluid comprises air received from a fan stream of the turbomachine.

5. The turbomachine cooling arrangement of claim 1, wherein the second turbomachine fluid comprises oil received from a fuel-oil heat exchanger.

6. The turbomachine cooling arrangement of claim 5, wherein fuel is communicated from the fuel-oil heat exchanger to a fuel pump mounted to a fuel pump pad established by the gearbox.

7. The turbomachine cooling arrangement of claim 1, wherein the heat exchanger assembly is disposed within a outlet manifold configured to communicate the first turbomachine fluid away from the pump.

8. The turbomachine cooling arrangement of claim 1, wherein the pump comprises a scroll diffuser.

9. The turbomachine cooling arrangement of claim 1, wherein the heat exchanger assembly comprises a multiple of individual heat exchangers.

10. The turbomachine cooling arrangement of claim 1, wherein the pump comprises a lubricant pump.

11. A turbomachine assembly comprising:
a turbomachine;
a gearbox associated with the turbomachine;
a pump at least partially mounted within the gearbox, wherein the pump is configured to compress a first fluid; and
a heat exchanger assembly configured to receive the first fluid from the pump, wherein thermal energy moves from a second fluid to the first fluid within the heat exchanger assembly.

12. The turbomachine assembly of claim 11, wherein the turbomachine is a gas turbine engine.

13. The turbomachine assembly of claim 11, wherein the second fluid is a lubricant configured to be circulated through the turbomachine.

14. The turbomachine assembly of claim 11, wherein the first fluid is air.

15. The turbomachine assembly of claim 11, including a second heat exchanger assembly, wherein thermal energy moves from the second fluid to a turbomachine fuel within the second heat exchanger assembly.

16. The turbomachine assembly of claim 15, wherein the heat exchanger assembly configured to receive the first fluid from the pump is mounted to the gearbox directly adjacent the second heat exchanger assembly.

17. The turbomachine assembly of claim 11, wherein the heat exchanger assembly is positioned within an outlet manifold.

18. A method of cooling a turbomachine fluid comprising:
   compressing a first fluid using a pump at least partially housed within a turbomachine gearbox; and
   communicating thermal energy from a second fluid using the first fluid.

19. The method of claim 18, wherein the second fluid is lubricant.

20. The method of claim 19, including heating a fuel using the second fluid.

\* \* \* \* \*